Figure 1:
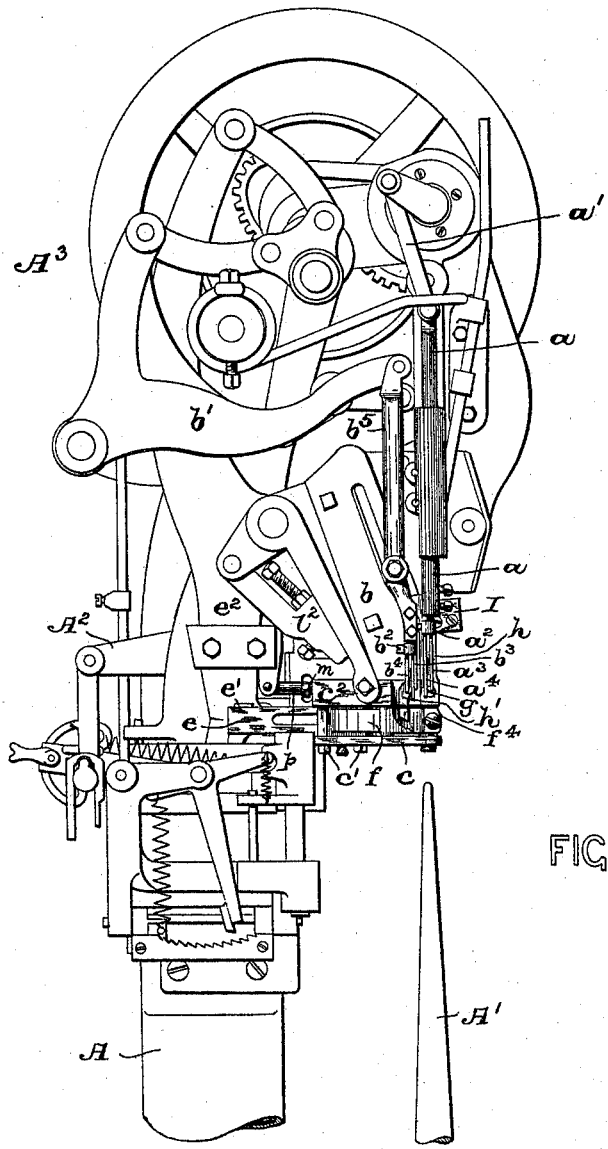

(No Model.)

5 Sheets—Sheet 1.

G. A. AMBLER.
NAILING MACHINE.

No. 586,154. Patented July 13, 1897.

WITNESSES:

INVENTOR:
GEORGE A. AMBLER,
BY
Fred C. Fraentzel,
ATTORNEY (No Model.) 5 Sheets—Sheet 2.
G. A. AMBLER.
NAILING MACHINE.
No. 586,154. Patented July 13, 1897.
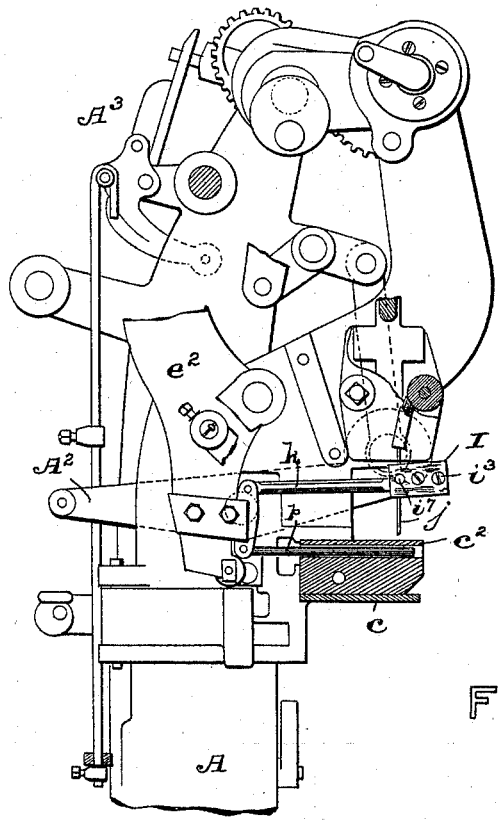
FIG. 1ª
WITNESSES: INVENTOR
GEORGE A. AMBLER,
BY
ATTORNEY (No Model.) 5 Sheets—Sheet 3.

G. A. AMBLER.
NAILING MACHINE.

No. 586,154. Patented July 13, 1897.

WITNESSES:
Thos. H Caufield Jr
Marcy J. Drusdell

INVENTOR:
GEORGE A. AMBLER,
BY
Fred C. Graentzel,
ATTORNEY (No Model.)
5 Sheets—Sheet 4.
G. A. AMBLER.
NAILING MACHINE.
No. 586,154.
Patented July 13, 1897.
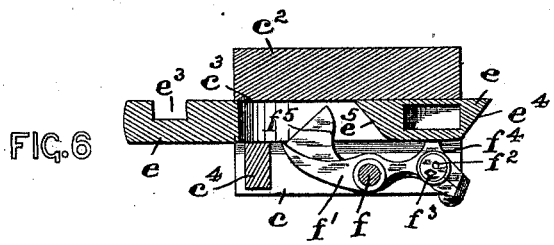
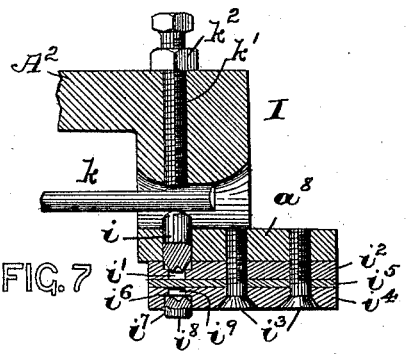
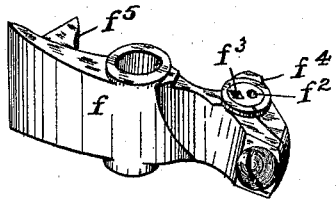
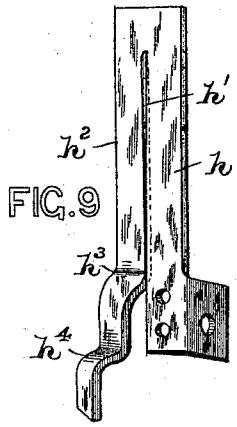
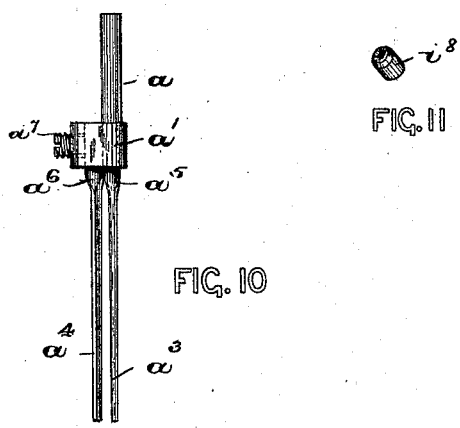
WITNESSES:
INVENTOR:
GEORGE A. AMBLER,
BY
Fred. C. Fraentzel,
ATTORNEY (No Model.) 5 Sheets—Sheet 5.

G. A. AMBLER.
NAILING MACHINE.

No. 586,154. Patented July 13, 1897.

WITNESSES:

INVENTOR:
GEORGE A. AMBLER,
BY
Fred C. Fraentzel,
ATTORNEY

UNITED STATES PATENT OFFICE.

GEORGE A. AMBLER, OF NEWARK, NEW JERSEY.

NAILING-MACHINE.

SPECIFICATION forming part of Letters Patent No. 586,154, dated July 13, 1897.

Application filed June 13, 1896. Serial No. 595,432. (No model.)

*To all whom it may concern:*

Be it known that I, GEORGE A. AMBLER, a citizen of the United States, residing at Newark, in the county of Essex and State of New Jersey, have invented certain new and useful Improvements in Nailing-Machines; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

My present invention relates to improvements in nailing-machines for uniting the soles and uppers of boots and shoes, and has for its primary object to provide a novel construction of wire-feeding attachment to be used in connection with this class of machines for uniting the soles and uppers of boots and shoes by means of wire fastenings which are fed into the stock to be united.

My novel improvements hereinafter fully described are to be used in a nailing-machine of the class set forth in United States Letters Patent No. 447,358, granted March 3, 1891, in which I employ a feeding device adapted to clamp two wire strands and feed them down into a cutting-box, where the two wires are clamped by means of a novel form of clamping or gripping device and held while a cutter is moved forward to notch and point the wires in the usual manner. While the wires are held clamped in the cutting-box and the points are being formed, the upper grippers or wire-feeding devices are moved backwardly along the wires, and the wires having been pointed the lower grippers or clamping device in the cutting box is released and the wire-feeding device again engages the wires and passes the pointed ends thereof a greater or less distance into a nail-carrier, which in the present construction is provided with two wire or nail passages. The pointed ends of the wires having been inserted into the nail-carrier, the latter is swung about a vertical axis, cutting off the wires between the lower end of the cutting-box and the said nail-carrier and placing the nails or slugs in position over the holes in the stock to be united into which they are driven by means of a nail-driver, which is actuated in the manner fully described in said Patent No. 447,358.

This invention therefore consists in the novel construction of feeding attachment hereinafter set forth and also in such novel arrangements and combinations of parts and details of construction to be clearly described in the accompanying specification and finally embodied in the clauses of the claim hereunto annexed.

I have illustrated my improvements in connection with a nailing-machine of the type illustrated in said Letters Patent No. 447,358; but it is also applicable to other forms of nailing-machines.

The invention is clearly illustrated in the accompanying sheets of drawings, in which—

Figure 2:
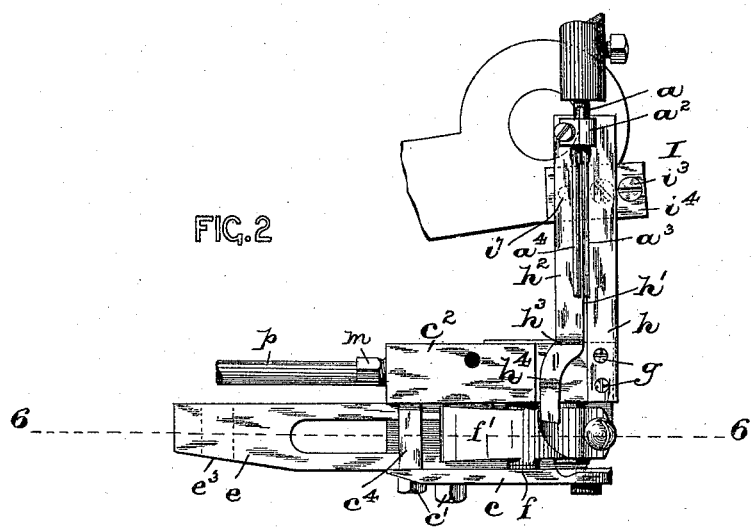
Figure 3:
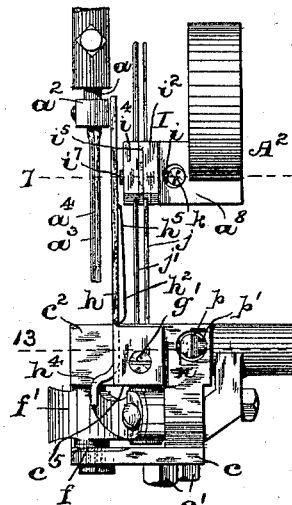
Figure 4:
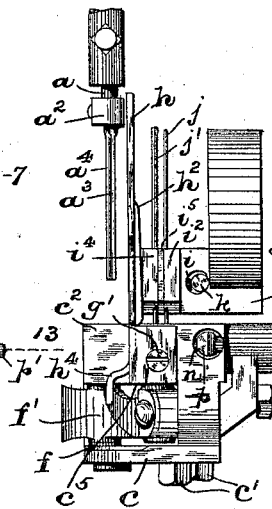
Figure 5:
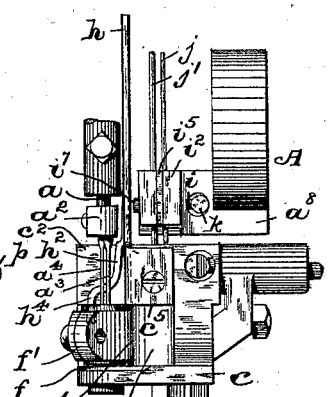
Figure 12:
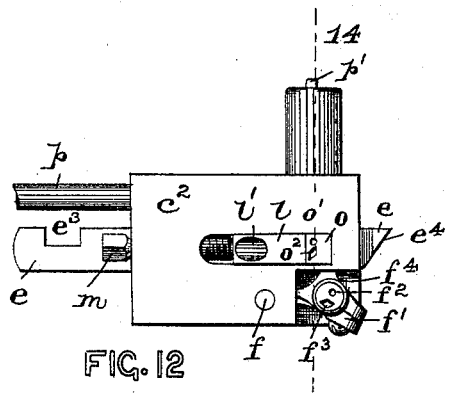
Figure 13:
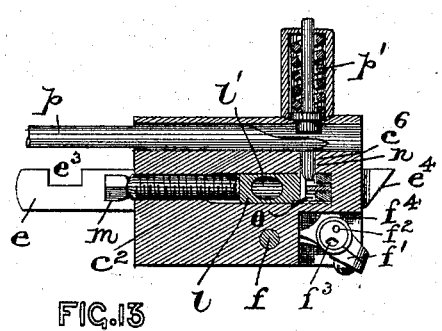
Figure 14:
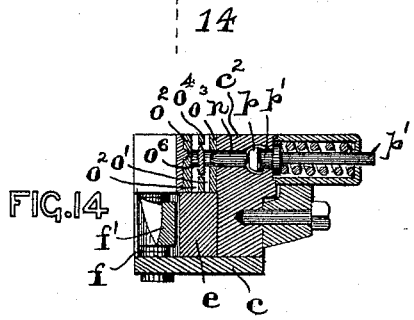
Figure 15:
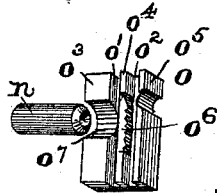
Figure 16:
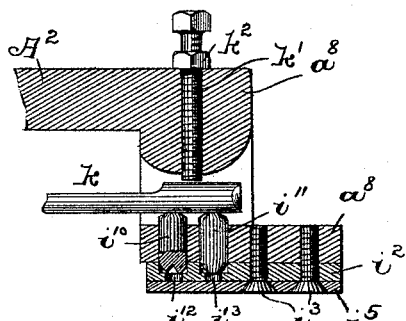
Figure 17:
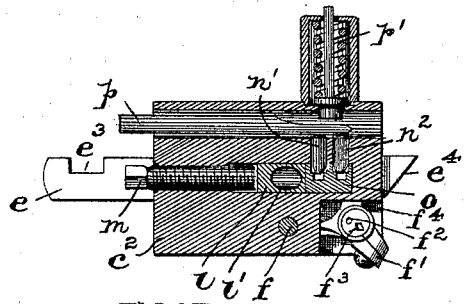

Figure 1 is a side elevation of a nailing-machine provided with my novel construction of feeding attachment. Fig. 1$^a$ is a view similar to Fig. 1 with certain parts at the front of said figure removed to more clearly illustrate the arrangement of the feeding device and the mechanism for operating the same. Fig. 2 is a side view of certain portions of the machine represented in said Letters Patent No. 447,358, illustrating in connection therewith, on an enlarged scale, the feeding attachment embodying the principles of my invention. Fig. 3 is a front elevation of the parts represented in said Fig. 2 in their normally inoperative position. Fig. 4 is a similar view of the said parts, illustrating the gripping attachment in the act of feeding the wires down just prior to the cutting operation; and Fig. 5 is a like view of the said parts after the gripping attachment has been released and the parts connected therewith are ready to be returned to their initial positions indicated in Figs. 2 and 3 and the carrier containing the nails or slugs which have been cut off from the wire strands has been moved to one side to bring said nails or slugs directly beneath the driver-bars. Fig. 6 is a horizontal section taken on line 6 6 in said Fig. 2, and Fig. 7 is a similar section taken on line 7 7 in Fig. 3. Fig. 8 is a perspective view of the carrier employed in connection with my present invention, and Fig. 9 is a perspective view of a spring-plate used in connection with the gripping attachment. Fig. 10 is a view of the driver-bar, and Fig. 11 is a perspective view of one of the gripping teats or plugs. Fig. 12 is a top or plan view of the head-block and nail-carrier. Fig. 13 is a horizontal section taken on line 13 13 in Fig. 3 to more clearly illustrate my novel arrangement of the lower gripper or clamping device, which holds the wires while they are being cut to form the nails or slugs; and Fig. 14 is a vertical cross-section taken on line 14 14 in Fig. 12. Fig. 15 is a perspective view of the holding parts of the gripper illustrated in said Figs. 13 and 14. Fig. 16 is a sectional view of the gripper illustrated in Fig. 7, but of a modified form of construction; and Fig. 17 is a like view of the gripper illustrated in Fig. 13, also of a modified form of construction.

Similar letters of reference are employed in all of the above-described views to indicate like parts.

In said drawings, A represents a column forming part of the frame of the nailing-machine of the proper shape and provided with suitable bearings to support the working parts $A^3$.

The lower part of the standard is not illustrated, and the horn $A'$ on which the boot or shoe is supported during the nailing operation is also represented in part only.

I will not attempt to set forth and enumerate all the several parts of the machine illustrated in Figs. 1 and $1^a$, since this construction of machine is fully described in the said Letters Patent No. 447,358, hereinabove mentioned. I will, however, refer to the driver-bar $a$, operated from the link $a'$, and the awl-bar $b$, operated by means of a link $b^5$ and lever $b'$.

It is my intention to use my improvements in connection with a duplex nailing-machine, and for this reason the driver-bar $a$ is provided with an enlargement $a^2$, having two sockets, in which I have arranged the holding-shanks $a^5$ and $a^6$ of the drivers $a^3$ and $a^4$, respectively, the same being securely held in place by a screw $a^7$, substantially as illustrated in Figs. 1 and 10. For the same reason the awl-bar $b$ is provided with an enlargement $b^2$, having two sockets, in which I arrange the ends of the two awls $b^3$ and $b^4$, the same being securely held in position in said sockets by a screw, as will be clearly seen from Fig. 1. The operation of the said awl-bar and the driver-bar will be clearly understood from an inspection of said Letters Patent No. 447,358, and need not be further described here.

In Figs. 2, 3, 4, and 5 I have more clearly illustrated an arrangement of nose-plate $c$, which is suitably bolted by bolts $c'$ to the lower edge of an angle-shaped head-block $c^2$, attached to the main slide $e$. Sliding between the side $c^3$ and a post $c^4$, connecting the head-block $c^2$ and the nose-plate $c$, is said slide-bar $e$, which receives a reciprocatory sliding movement between said parts from a block $e'$, connected with a lever $e^2$ of the machine, the said block $e'$ entering a notch or groove $e^3$ in the outer end of said slide.

The nose-plate $c$ has pivoted on it at $f$ a nail-carrier $f'$, having a pair of nail holes or passages $f^2$ and $f^3$, corresponding to a pair of holes in the nose-plate.

The arrangement of the operating mechanism of the machine is such that the nail-carrier $f'$ is vibrated at times about its pivot $f$ by means of the slide-bar $e$, having the two edges $e^4$ and $e^5$, the edge $e^4$ acting against the cam-surface $f^4$ of the nail-carrier, while the cam-surface $e^5$ acts against the cam-surface $f^5$ of the nail-carrier, the object being to swing the nail-carrier, after the wire strands have been inserted in the holes $f^2$ and $f^3$, to one side and sever said strands by means of a cutting edge $c^5$ of the head-block and bring the nails or slugs directly beneath the drivers $a^3$ and $a^4$ of the driver-bar $a$. The construction of said carrier slide or bar $e$ is such that its parallel or straight side next to the nail-carrier acts upon the latter to lock the same in its two extreme positions at the proper time. At or near the front of said head-block $c^2$ and secured to one side thereof by means of screws or bolts $g$ and $g'$ is an upwardly-extending post $h$, which is slotted, as at $h'$, thereby providing a downwardly-extending spring-arm $h^2$, having the curved portions $h^3$ and $h^4$. Said post $h$ and the arm $h^2$ thereof, as will be seen from Figs. 3, 4, and 5, are adjacent to the drivers $a^3$ and $a^4$ and their driver-bar $a$, and directly behind said post $h$ and the spring-arm $h^2$ is a reciprocating wire gripping or feeding device I, which is secured directly to a lever $A^2$, as will be clearly evident from an inspection of Figs. $1^a$ and 2. This wire-feeding device consists, essentially, of a gripper-teat $i$, placed in a hole in the member $a^8$ of said lever $A^2$, and its notched gripping portion extends into a wire-passage $i'$ in a gripper-plate $i^2$. Secured to said plate $i^2$ by means of screws $i^3$ are a gripper-plate $i^4$ and a separating-plate $i^5$, these parts constituting the gripper-box of the feeding device I, all of which are secured directly against the said portion $a^8$ of the lever $A^2$, as clearly illustrated in Fig. 7. Said gripper-plate $i^4$ has a hole $i^6$, in which is arranged a second gripper-teat $i^7$, the projecting end $i^8$ of which in its normal state bears lightly against the back of the said spring-arm $h^2$, hereinabove mentioned. The two wires from which the nails or slugs are cut are represented by the letters $j$ and $j'$ and respectively pass through the hole or groove $i'$ in the plate $i^2$ and the hole or groove $i^6$ in the plate $i^4$ directly in front of the sharp gripping edges of the respective teats $i$ and $i^7$. The teat $i$ is moved by a cam-rod $k$, which in its movement bears against an adjusting-screw $k'$, screwed into the lever $A^2$, and is checked by a check-nut $k^2$.

While the feeding gripper or teat $i$ is in grip with the one wire $j$ the lever $A^2$ makes its descent, taking the wire with it, and during this operation the nail-carrier $f'$ swings on its pivot, which brings the same against the curved part $h^4$ of the spring-arm $h^2$, thereby causing a firm binding action of said arm against the projecting end of the gripper-teat $i^7$ during the descent of the feeding device I. This forces the gripping end of said teat $i^7$ against the wire $j'$, thus taking said wire with it, and both wires $j$ and $j'$ are inserted in their respective holes or openings in a suitable clamping device in the cutting-box of the head-block $c^2$.

The holes or wire-passages of the clamping device or lower gripper, the construction of which will be presently described, are directly above the holes or openings in the nail-carrier $f'$ when the latter is at rest.

As will be seen from an inspection of Figs. 12 and 13, in the head-block $c^2$ is held by means of an adjusting-screw $m$ a guide-block $l$, having an inclined hole $l'$, through which the cutting-knife $l^2$ (see Fig. 1) passes and points the ends of the two wires $j$ and $j'$. During this pointing operation of the said wire strands $j$ and $j'$ they are held in the passages $o'$ and $o^2$ of the clamping device. (Illustrated more particularly in Figs. 13, 14, and 15.) Said clamping device consists, essentially, of a suitable block $o$, adapted to be arranged and secured in the head-block $c^2$ directly in front of the guide-block $l$ and is provided with the passages $o'$ and $o^2$, formed by the parts $o^3$, $o^4$, and $o^5$ of said block. In a cut-away portion in the rib $o^4$ of said block is a loosely-arranged gripper-plate $o^6$, provided with suitable serrations, substantially as shown. As will be seen from said Figs. 13, 14, and 15, said block $o$ is provided with a curved portion $o^7$, into which extends the end of a suitable gripper-rod $n$, commonly termed the "holding-gripper," which enters a hole $c^6$ in the plate $c^2$ and also extends into the wire-passage $o'$ and against the side of said gripper-block $o^6$, thereby securely holding one of the wires, as $j$, between the holding-gripper $n$ and the side of the block $o^6$. At the same time a cam-rod $p$, which is operated by the mechanism of the nailing-machine, as set forth in said Letters Patent No. 447,358, acts against the end of a spring-actuated pin $p'$ and the opposite end of the holding-gripper $n$, thereby firmly forcing the latter not merely against the wire $j$, but also against the block $o^6$ and the latter against the wire $j'$, whereby the same is firmly clamped between the serrated side of said block and the inner side of the portion $o^5$ of the block $o$, as will be clearly evident from Figs. 13 and 14.

The two cam-rods $k$ and $p$ are moved backward and forward in unison with the lever $e^2$, but their construction is such that they act alternately on the feeding device and the clamping-grippers to force one against the wires while the other is released.

As soon as the lower grippers or clamping device in the cutting-box is released the upper grippers or feeding device again engages the wires $j$ and $j'$ and passes their pointed ends into the respective holes or passages in the nail-carrier $f'$, which immediately vibrates about its pivot $f$ by the slide-bar $e$ coming in sliding engagement therewith in the manner hereinabove stated, whereby the two wires are severed and brought directly above the two holes previously made by the awls in the stock to be united, and said severed wires are then driven home by the drivers connected with the driver-bar $a$.

By the construction herein set forth I have produced an operative device for feeding two wires at one time to the stock to be united, the parts of the device being operated by mechanism similar to that set forth in Letters Patent No. 447,358, and all the different operations of forming the holes in the stock to be united, feeding and severing the wires, and driving the nails or slugs following in consecutive order, precisely in the manner described in connection with the construction of the nailing-machine illustrated in said Letters Patent hereinabove mentioned.

In Fig. 16 I have illustrated a slightly-modified form of construction of the upper grippers or feeding device in which I dispense with the use of the gripper-plate $i^4$. In this construction the member $a^8$ of the lever $A^2$ is provided with two holes, in each of which I have arranged a gripper-teat $i^{10}$ and $i^{11}$, which have their notched gripping portions extending into the respective wire-passages $i^{12}$ and $i^{13}$ in the gripper-plate $i^2$.

The arrangement and construction of the other parts of this device, as well as the operation of the same in feeding the two wire strands, are similar to that described hereinabove and illustrated in Fig. 7.

In lieu of the construction of the lower grippers or clamping device illustrated in Figs. 13 and 14 the block $o$ may be provided with two wire-passages, into which extend the two gripper-bars $n'$ and $n^2$, which are actuated by the cam-rod $p$ in the manner hereinabove described, and as will be clearly evident from an inspection of said Fig. 17.

Having thus described my invention, what I claim is—

1. In a nailing-machine, the combination, with a cutting-box and a nail-carrier having two wire-passages, of a gripper or clamping device, comprising therein, a block $o$ having wire-passages $o'$ and $o^2$, a gripping-block $o^6$, loosely arranged between said wire-passages, a gripper-bar $n$, and means for actuating the same, substantially as and for the purposes set forth.

2. In a nailing-machine, the combination, with a cutting-box and means to support it, a pivoted carrier having two wire-passages, and a slide-bar, as $e$, adapted to reciprocate said carrier, of a gripper or clamping device, comprising therein a block $o$ having wire-passages $o'$ and $o^2$, a gripping-block $o^6$, loosely arranged between said wire-passages, a gripper-bar $n$, and means for actuating the same, substantially as and for the purposes set forth.

3. In a nailing-machine, a feeding-gripper comprising therein, a pair of gripping-plates, as $i^2$ and $i^4$, having wire-passages, a pair of gripping-teats arranged in holes in said plates, and means for actuating one of said teats, and a spring-bar adapted to actuate the other one of said teats, combined with a pivoted nail-carrier, and means to actuate said carrier, said carrier being adapted to engage said spring-bar and thereby actuate said other teat, substantially as and for the purposes set forth.

4. In a nailing-machine, a feeding-gripper comprising therein, a pair of gripping-plates, as $i^2$ and $i^4$, having wire-passages, a pair of gripping-teats arranged in holes in said plates, and means for actuating said teats, combined with a pivoted nail-carrier, a slide-bar, as $e$, adapted to reciprocate said carrier, and a gripper or clamping device, comprising therein, a block $o$ having wire-passages $o'$ and $o^2$, a gripping-block $o^6$, loosely arranged between said wire-passages, a gripper-bar $n$, and means for actuating the same, substantially as and for the purposes set forth.

5. In a nailing-machine, a feeding-gripper, comprising therein, a pair of gripping-teats $i$ and $i^7$, a cam-rod $k$ for actuating said teat $i$ and a spring-bar $h^2$ connected with a post $h$ for actuating said teat $i^7$, combined with a pivoted nail-carrier, and means to actuate said carrier, substantially as and for the purposes set forth.

6. In a nailing-machine, a feeding-gripper, comprising therein, a pair of gripping-plates $i^2$ and $i^4$, having wire-passages, a pair of gripping-teats $i$ and $i^7$ arranged in holes in said plates, a cam-rod $k$ for actuating said teat $i$ and a spring-arm $h^2$ connected with a post $h$ for actuating said teat $i^7$, combined with a pivoted nail-carrier, and means to actuate the same, substantially as and for the purposes set forth.

7. In a nailing-machine, a feeding-gripper, comprising therein, a pair of gripping-plates $i^2$ and $i^4$, having wire-passages, a pair of gripping-teats $i$ and $i^7$ arranged in holes in said plates, a cam-rod $k$ for actuating said teat $i$ and a spring-arm $h^2$ connected with a post $h$ for actuating said teat $i^7$, combined with a pivoted nail-carrier, a slide-bar, as $e$, adapted to reciprocate said carrier, and a gripper or clamping device, comprising therein, a block $o$ having wire-passages $o'$ and $o^2$, a gripping-block $o^6$, loosely arranged between said wire-passages, a gripper-bar $n$, and means for actuating the same, substantially as and for the purposes set forth.

8. In a nailing-machine, the combination, with the head-block $c^2$ and a post $h$ thereon, having a spring-bar $h^2$, of a gripper or feeding device, comprising therein, a gripping-teat $i^7$ adapted to be actuated by said spring-bar $h^2$, substantially as and for the purposes set forth.

9. In a nailing-machine, the combination, with the head-block $c^2$ and a post $h$ thereon, having a spring-bar $h^2$, of a gripper or feeding device, comprising therein, a gripping-teat $i^7$ adapted to be actuated by said spring-bar $h$ to force it against the wire, and a pivoted nail-carrier, adapted to be rotated against said spring-bar to disengage said bar from said gripping-teat $i^7$, substantially as and for the purposes set forth.

10. In a nailing-machine, the nose-plate having a pair of nail-passages, and a pivoted nail-carrier provided with a pair of openings forming wire-passages, said carrier having at its inner side and at opposite sides of its center cam-surfaces $f^4$ and $f^5$, a slide-bar $e$ adapted to vibrate and lock the said nail-carrier, as set forth, and a post $h$ having a spring-bar adapted to be actuated by said nail-carrier, substantially as and for the purposes set forth.

11. In a nailing-machine, the nose-plate having a pair of nail-passages, and a pivoted nail-carrier provided with a pair of openings forming wire-passages, said carrier having at its inner side and at opposite sides of its center cam-surfaces $f^4$ and $f^5$, a slide-bar $e$ adapted to vibrate and lock the said nail-carrier, as set forth, and a post $h$ having a spring-bar adapted to be actuated by said nail-carrier, all combined with an upper feeding-gripper, consisting, essentially, of a pair of gripping-teats $i$ and $i^7$, a cam-rod $k$ for actuating said teat $i$, and the seat $i^7$ being actuated by said spring-bar, substantially as and for the purposes set forth.

12. In a nailing-machine, the nose-plate having a pair of nail-passages, and a pivoted nail-carrier provided with a pair of openings forming wire-passages, said carrier having at its inner side and at opposite sides of its center cam-surfaces $f^4$ and $f^5$, a slide-bar $e$ adapted to vibrate and lock the said nail-carrier, as set forth, and a post $h$ having a spring-bar adapted to be actuated by said nail-carrier, all combined with an upper feeding-gripper, consisting, essentially, of a pair of gripping-teats $i$ and $i^7$, a cam-rod $k$ for actuating said teat $i$, and the teat $i^7$ being actuated by said spring-bar, and a lower clamping or gripping device, consisting, of a block $o$ having wire-passages $o'$ and $o^2$, a gripping-block $o^6$, loosely arranged between said wire-passages, a gripper-bar $n$, and means for actuating the same, substantially as and for the purposes set forth.

13. The herein-described upper gripper or feeding device for nailing-machines, comprising, in combination, with the part $a^8$ of the lever $A^2$ of a nailing-machine, plates $i^3$, $i^4$ and $i^5$ secured to said part $a^8$, wire-passages $i'$ and $i^6$, and gripping-teats $i$ and $i^7$ extending into said passages $i'$ and $i^6$, substantially as and for the purposes set forth.

14. The herein-described lower gripper or clamping device, comprising therein, a block $o$ having wire-passages $o'$ and $o^2$, and a gripper-block $o^6$ loosely arranged between said passages, substantially as and for the purposes set forth.

In testimony that I claim the invention set forth above I have hereunto set my hand this 10th day of June, 1896.

GEORGE A. AMBLER.

Witnesses:
FREDK. C. FRAENTZEL,
WM. H. CAMFIELD, Jr.